(12) United States Patent
Chang et al.

(10) Patent No.: US 7,894,543 B2
(45) Date of Patent: Feb. 22, 2011

(54) APPARATUS AND METHOD FOR CANCELING INTERFERENCE IN BROADBAND WIRELESS ACCESS SYSTEM

(75) Inventors: Chung-Ryul Chang, Yongin-si (KR); Keun-Chul Hwang, Seongnam-si (KR); Soon-Young Yoon, Seoul (KR); June Moon, Seoul (KR)

(73) Assignee: Samsung Electronics Co., Ltd (KR)

( * ) Notice: Subject to any disclaimer, the term of this patent is extended or adjusted under 35 U.S.C. 154(b) by 726 days.

(21) Appl. No.: 11/942,465

(22) Filed: Nov. 19, 2007

(65) Prior Publication Data

US 2008/0130803 A1 Jun. 5, 2008

(30) Foreign Application Priority Data

Nov. 17, 2006 (KR) .................. 10-2006-0113619

(51) Int. Cl.
H04B 7/02 (2006.01)
(52) U.S. Cl. ................. 375/267; 375/260; 375/322; 455/427; 370/210; 370/342; 370/344
(58) Field of Classification Search ................. 375/260, 375/267, 322; 455/427; 370/210, 342, 344
See application file for complete search history.

(56) References Cited

U.S. PATENT DOCUMENTS 7,372,896 B2 5/2008 Bjerke et al.

| | | | |
|---|---|---|---|
| 2002/0196871 A1* | 12/2002 | Nishio et al. | 375/322 |
| 2004/0120299 A1* | 6/2004 | Kidiyarova-Shevchenko et al. | 370/342 |
| 2006/0008018 A1* | 1/2006 | Kolze | 375/260 |
| 2008/0025200 A1* | 1/2008 | Tiirola et al. | 370/210 |
| 2010/0182989 A1* | 7/2010 | Ramesh et al. | 370/344 |
| 2010/0203884 A1* | 8/2010 | Zheng et al. | 455/427 |

FOREIGN PATENT DOCUMENTS

| KR | 1020050058269 | 6/2005 |
|---|---|---|
| KR | 1020060092400 | 8/2006 |

OTHER PUBLICATIONS

Ye Li et al., "MIMO-OFDM for Wireless Communications: Signal Detection with Enhanced Channel Estimation", IEEE Transactions on Communications, vol. 50, No. 9, pp. 1471-1477, Sep. 2002.

* cited by examiner

Primary Examiner—Sudhanshu C Pathak
(74) Attorney, Agent, or Firm—The Farrell Law Firm, P.C.

(57) ABSTRACT

Provided are an apparatus and method for canceling interference in a Broadband Wireless Access (BWA) system. The method includes estimating channel coefficient vectors of a plurality of Mobile Stations (MSs) using the same resource; computing a correlation matrix by subtracting a channel coefficient vector of a corresponding MS from a specific tone input vector within the same resource and by auto-correlating the subtracted vector; canceling interference from the data-tone input vector and the channel matrix by using the correlation matrix; and estimating a transmission symbol for each MS by performing Multiple Input Multiple Output (MIMO) detection by using the interference-cancelled input vector and the interference-cancelled channel matrix.

20 Claims, 8 Drawing Sheets

APPARATUS AND METHOD FOR CANCELING INTERFERENCE IN BROADBAND WIRELESS ACCESS SYSTEM

PRIORITY

This application claims priority under 35 U.S.C. §119 to an application filed in the Korean Intellectual Property Office on Nov. 17, 2006 and assigned Serial No. 2006-113619, the contents of which are incorporated herein by reference.

BACKGROUND OF THE INVENTION

1. Field of the Invention

The present invention relates to an apparatus and method for canceling interference in a Broadband Wireless Access (BWA) system, and, in particular, to an apparatus and method for canceling interference of neighboring cells in a multi-cell based BWA system.

2. Description of the Related Art

In general, voice services have been a primary concern in the development of communication systems. In addition to voice service, provision of various multimedia services as well as data services is becoming important when developing communication systems. However, a voice-based communication system fails to satisfy user demand due to a relatively small transmission bandwidth and an expensive service fee. Moreover, the advance of communication technologies and the growth of demand for Internet services have resulted in an increased need for a communication system capable of effectively providing the Internet services. To cope with such user demand, a Broadband Wireless Access (BWA) system has been introduced for effective provision of broadband Internet services.

In addition to voice services, the BWA system supports various data services with a high or low speed as well as multimedia application services (e.g., high-quality moving pictures). The BWA system can access a Public Switched Telephone Network (PSTN), a Public Switched Data Network (PSDN), an Internet network, an IMT2000 network, and an Asynchronous Transfer Mode (ATM) network in a fixed or mobile environment based on a wireless medium using a broadband spectrum (e.g., 2 GHz, 5 GHz, 26 GHz, 60 GHz, etc.). Furthermore, the BWA system can support a channel transfer rate of 2 Mbps or more. According to mobility of a Mobile Station (MS) (i.e., whether it is moving or fixed), communication environment (i.e., indoor or outdoor), and a channel transfer rate, the BWA may be classified into a broadband wireless subscriber network, a broadband mobile access network, and a high speed wireless Local Area Network (LAN).

A wireless access method of the BWA system is standardized by the Institute of Electrical and Electronics Engineers (IEEE) 802.16 group.

According to the IEEE 802.16 standard, due to a wide bandwidth, larger sized data can be transmitted at a short period of time compared with the conventional wireless technique for a voice service. In addition, a channel (or resource) can be shared by all MSs, resulting in effective channel use. Moreover, since a Quality of Service (QoS) is ensured, the MSs can receive different QoSs on the basis of service features.

In the IEEE 802.16 communication system, an Orthogonal Frequency Division Multiplexing (OFDM)/Orthogonal Frequency Division Multiple Access (OFDMA) scheme is used for a physical channel. That is, the BWA system employing the OFDM/OFDMA method transmits a physical channel signal by using a plurality of sub-carriers, and thus high-speed data transmission can be achieved.

With a multi-cell structure, the BWA system can support mobility of an MS, and all cells can use the same frequency for the effective use of frequency resources. However, performance of such a multi-cell based system is significantly affected by interference of neighboring cells.

Figure 1:
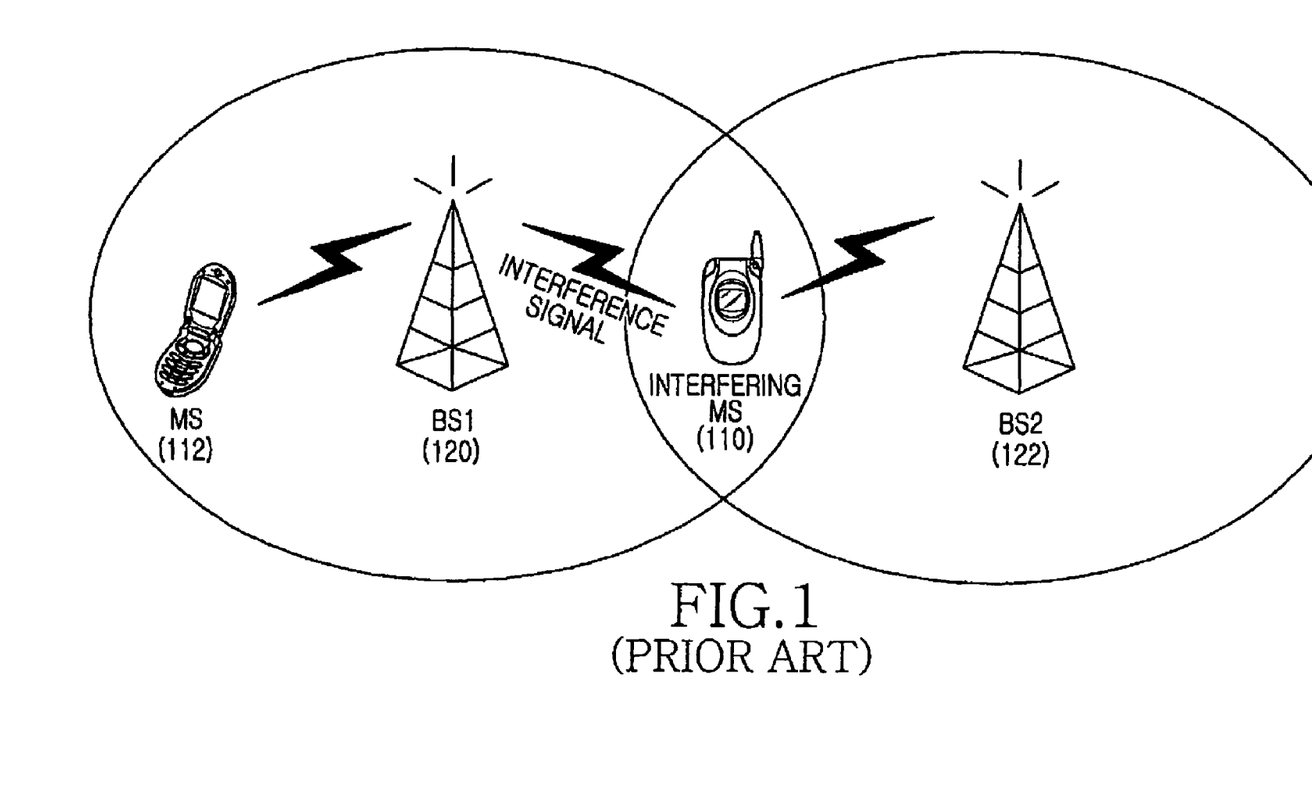
FIG. 1 illustrates a multi-cell based Broadband Wireless Access (BWA) system.

FIG. 1 illustrates a multi-cell based BWA system.

Referring to FIG. 1, MS 110 is located in a cell overlap region in a multi-cell environment having a frequency reuse rate of 1. MS 110 transmits an interference signal to a Base Station (BS) 1 located in a neighboring cell. The interference signal affects a signal of an MS 112 located within the cell, resulting in deterioration of demodulation performance. Therefore, a method of canceling neighboring cell interference is necessary in such a multi-cell based system.

Figure 2:
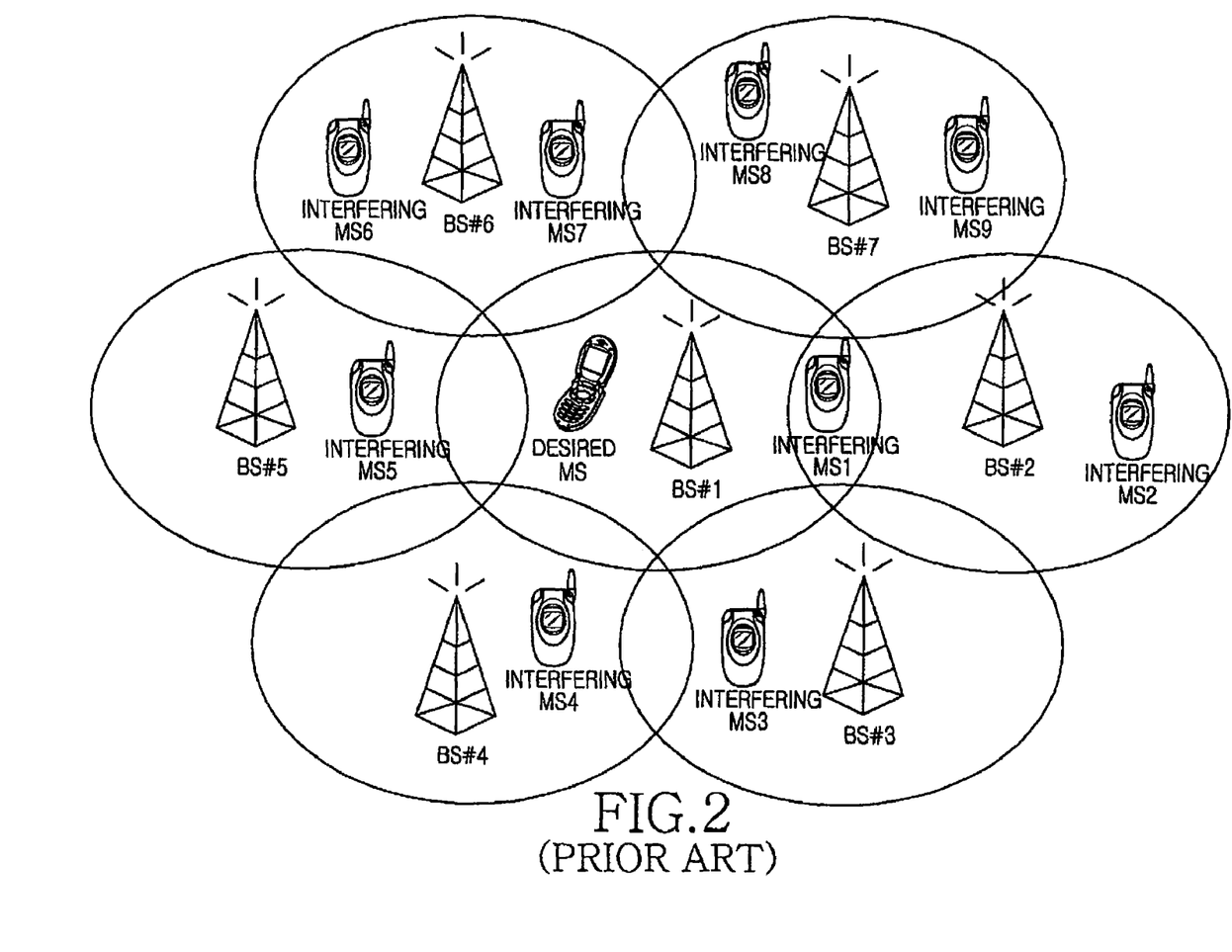
FIG. 2 illustrates a multi-cell Up-Link (UL) environment when neighboring cell interference occurs.

FIG. 2 illustrates a multi-cell Up-Link (UL) environment when neighboring cell interference occurs.

Referring to FIG. 2, in practice, neighboring cell interference is caused by a plurality of cells (or MSs). A conventional method of canceling multi-cell interference in such an environment will now be described.

One example of the conventional method of canceling interference is based on a Minimum Mean Square Error (MMSE) scheme.

The MMSE based method can be expressed as Equation (1) below.

$$\hat{x} = WY$$
$$W = (H_D)^H R^{-1} \qquad (1)$$

Herein, Y denotes an input signal, and is an $N_R \times 1$ column vector when the number of receiving antennas is $N_R$. W denotes an MMSE filter coefficient, and is a $1 \times N_R$ row vector when the number of signals to be demodulated is 1. $\hat{x}$ denotes a signal estimated using an MMSE filter. $H_D$ denotes a wireless channel feature of a signal to be demodulated, and is an $N_R \times 1$ column vector. R denotes a correlation of an input signal, and is an $N_R \times N_R$ matrix. Exponential −1 denotes an inverse matrix. Exponential H denotes a Hermitian Transpose.

In Equation (1), the correlation matrix R is expressed as Equation (2) below.

$$R = E[YY^H] \qquad (2)$$
$$= E[(HX + N)(HX + N)^H]$$
$$= HH^H + \sigma^2 I$$

Herein, X denotes a vector of signals transmitted from all MSs, and is an $N_U \times 1$ column vector when the number of MSs is $N_U$. H denotes a wireless channel matrix between MSs and receiving antennas, and is an $N_R \times N_U$ matrix. N denotes noise of a receiving antenna, and is an $N_R \times 1$ column vector. $\sigma^2$ denotes noise power. I denotes an $N_R \times N_R$ identity matrix.

As described above, the conventional method of canceling interference using the MMSE scheme has a problem in that channel estimation has to be carried out not only for a channel of a desired MS but also for a channel of a neighboring cell producing an interference signal. This case makes it difficult to determine the number of valid interference signals. Furthermore, channel estimation for an interference signal is obtained through a complex computation process. In addition, since the interference signal has a smaller magnitude than a desired signal to be demodulated, accuracy of channel estimation is not guaranteed, thereby deteriorating demodulation performance.

Accordingly, due to complexity and inaccuracy of computation, there has been difficulty in the use of the conventional method of canceling interference using the MMSE scheme.

SUMMARY OF THE INVENTION

The present invention provides an apparatus and method for reducing computational complexity of a Minimum Mean Square Error (MMSE) based interference canceller in a Broadband Wireless Access (BWA) system.

The present invention also provides an apparatus and method for canceling neighboring cell interference in a BWA system.

The present invention also provides an apparatus and method for canceling interference from a signal transmitted from a Collaborative Spatial Multiplexing (CSM) Mobile Station (MS) and for performing Multiple Input Multiple Output (MIMO) detection by using the interference-cancelled signal in a BWA system.

According to one aspect of the present invention, there is provided a receiving apparatus in a BWA system that includes a channel estimator for estimating channel coefficients of a plurality of MSs using the same resource; an interference canceller for canceling interference from an input vector and a channel matrix by subtracting a channel coefficient of a corresponding MS from a specific input signal within the same resource, by computing a correlation matrix of the subtracted signal, and by using the correlation matrix; and a detector for performing MIMO detection by using the interference-cancelled input vector and the interference-cancelled channel matrix.

According to another aspect of the present invention, there is provided a receiving method in a BWA system that estimates channel coefficient vectors of a plurality of MSs using the same resource; computes a correlation matrix by subtracting a channel coefficient vector of a corresponding MS from a specific tone input vector within the same resource and by auto-correlating the subtracted vector; cancels interference from the data-tone input vector and the channel matrix by using the correlation matrix; and estimates a transmission symbol for each MS by performing MIMO detection by using the interference-cancelled input vector and the interference-cancelled channel matrix.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

The present invention is described with reference to the accompanying drawings, in which exemplary embodiments of the invention are shown. In the description of the present invention, if it is determined that a detailed description of commonly-used technologies or structures related to the invention may unintentionally obscure the subject matter of the invention, the detailed description will be omitted.

A method of canceling multi-cell interference in a Broadband Wireless Access (BWA) system of the present invention will now be described. The BWA system below is provided as an example and the present invention may also be applied to other multi-cell based communication systems. In addition, although a receiver of a Base Station (BS) will be explained for example in the following description, the present invention may also be applied with the receiver is included in a Mobile Station (MS) instead of the BS.

Figure 3:
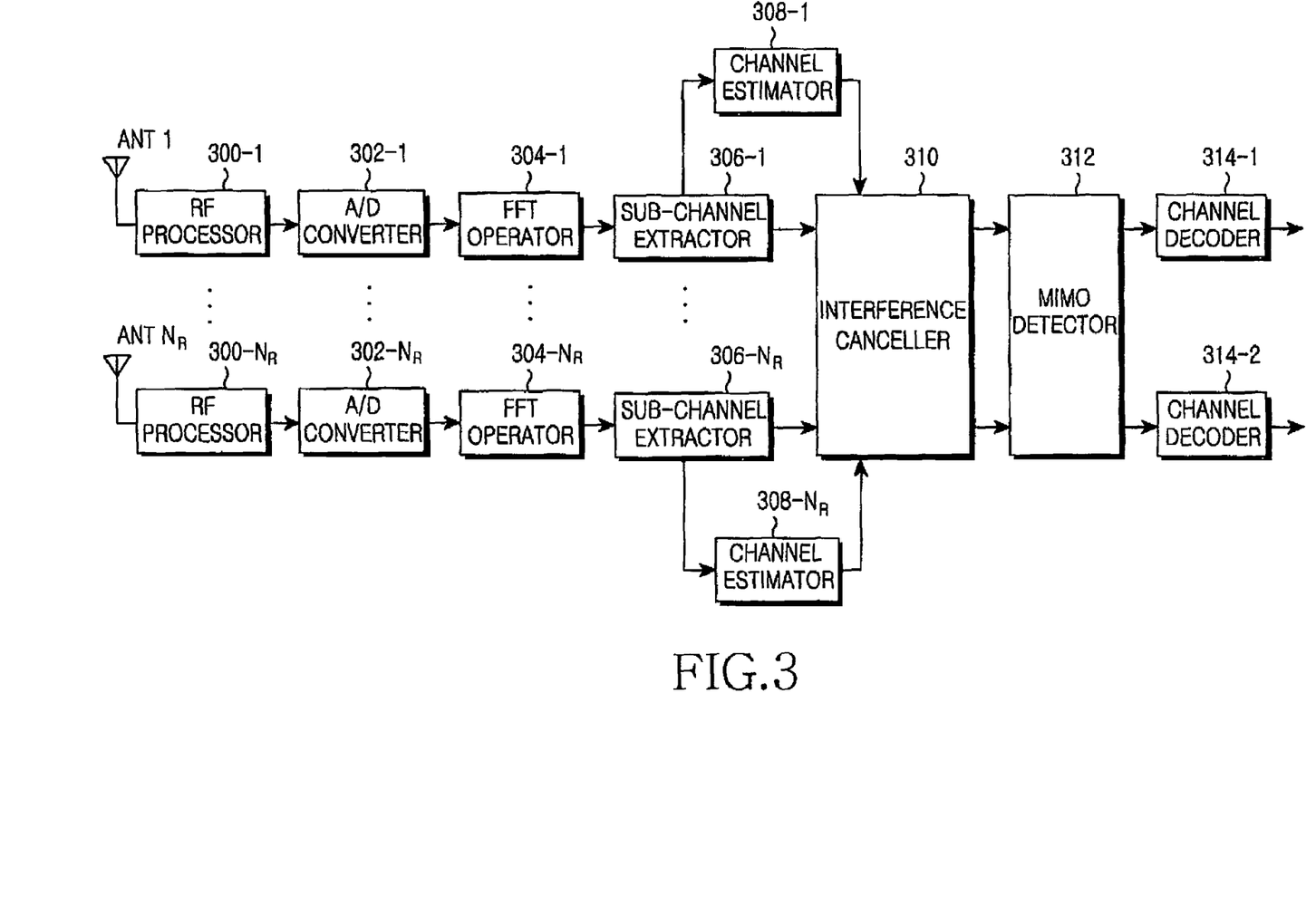
FIG. 3 is a block diagram of a receiver of a BWA system according to the present invention.

FIG. 3 is a block diagram of a receiver of a BWA system according to the present invention. Referring to FIG. 3, the receiver includes antennas ANT-1 to ANT-$N_R$, Radio Frequency (RF) processors 300-1 to 300-$N_R$, Analog to Digital (A/D) converters 302-1 to 302-$N_R$, Fast Fourier Transform (FFT) operators 304-1 to 304-$N_R$, sub-channel extractors 306-1 to 306-$N_R$, channel estimators 308-1 to 308-$N_R$, an interference canceller 310, a Multiple Input Multiple Output (MIMO) detector 312, and channel decoders 314-1 and 314-2. In the following description, it will be assumed that a Partial Usage of Sub-Carrier (PUSC) sub-channel structure is used in a Collaborative Spatial Multiplexing (CSM) mode.

The RF processors 300-1 to 300-$N_R$ each include a filter, a frequency converter, and so on, and convert RF signals received through corresponding antennas into baseband signals. The A/D converts 302-1 to 302-$N_R$ each convert analog baseband signals received from the respective RF processors 300 into digital signals.

Figure 6:
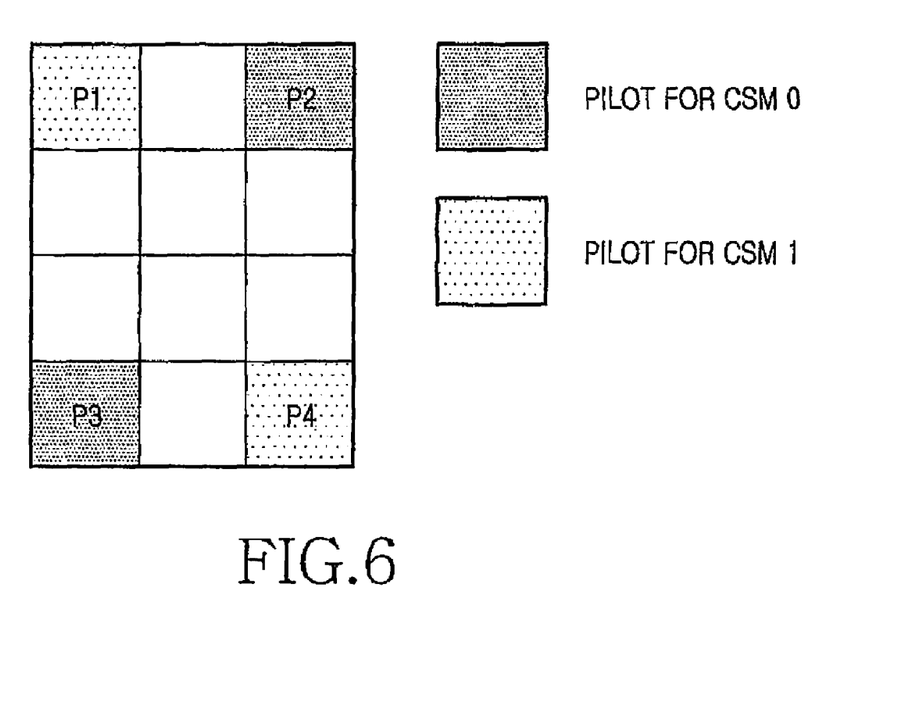
FIG. 6 illustrates a tile structure according to a CSM mode.

The FFT operators 304-1 to 304-$N_R$ convert sample data received from the respective A/D converters 302-1 to 302-$N_R$ through an FFT operation, and output frequency-domain data. The sub-channel extractors 306-1 to 306-$N_R$ receive the frequency-domain data from the respective FFT operators 304-1 to 304-$N_R$ according to a sub-channel structure, and separately extract data signals and pilot signals from the received data. If a PUSC sub-channel structure of a CSM mode shown in and described in regard to FIG. 6 is used, the sub-channel extractor 306 extracts four pilot signals for each predetermined unit (or tile), and provides the extracted signals to the channel estimator 308. When operating in the CSM mode, two pilot signals within a tile are signals of a first CSM MS, and the rest two pilot signals are signals of a second CSM MS. The sub-channel extractor 306 provides the extracted data signals and pilot signals to the interference canceller 310.

Each of the channel estimators 308-1 to 308-$N_R$ estimates a channel efficient of a desired MS to be subject to demodulation, using a pilot signal received from the corresponding sub-channel extractor 306. Various channel estimation methods may be used herein. For example, influence of interference may be minimized by averaging pilot tones. In one embodiment of the present invention, two pilot signals within one tile are averaged. Channel estimation for each tile can be expressed as Equation (3) below.

$$\hat{h}_0 = \frac{1}{2}(P_2 + P_3) \qquad (3)$$
$$\hat{h}_1 = \frac{1}{2}(P_1 + P_4)$$

Herein, $\hat{h}_k$ denotes an estimated channel coefficient of a k-th CSM MS. When tiles are present in a continuous manner in the time axis, an average value may be computed in an extended period along the time axis so as to increase channel estimation performance. In this case, a total of $N_R$ channel coefficients output from the plurality of channel estimators 308-1 to 308-$N_R$ may constitute an $N_R \times 1$ channel coefficient vector $\hat{H}_k$. That is, for one tile, a channel coefficient vector $\hat{H}_0$ of the first CSM MS and a channel coefficient vector $\hat{H}_1$ of the second CSM MS are obtained.

The interference canceller 310 computes a correlation matrix R using the two channel coefficient vectors $\hat{H}_0$ and $\hat{H}_1$ received from the channel estimators 308-1 to 308-$N_R$ and using a pilot-tone input vector Y received from sub-channel extractors 306-1 to 306-$N_R$. Further, the interference canceller 310 computes a coefficient W of an interference canceling filter by using the correlation matrix and the channel coefficient vectors. In addition, the interference canceller 310 assigns the computed coefficient to the interference canceling filter, filters a data-tone input vector received from the sub-channel extractors 306-1 to 306-$N_R$ by the use of the interference canceling filter, and outputs an interference-cancelled signal $\hat{Y}_{IC}$. Furthermore, the interference canceller 310 filters a channel matrix composed of the two channel coefficient vectors by the use of the interference canceling filter, and outputs an interference-cancelled channel matrix $\hat{H}_{IC}$. The structure of the interference canceller 310 is further described with reference to FIG. 7.

In a MIMO environment, the MIMO detector 312 uses the interference-cancelled input vector $\hat{Y}_{IC}$ received from the interference canceller 310 and the interference-cancelled channel matrix $\hat{H}_{IC}$ so as to perform MIMO detection. Then, the MIMO detector 312 estimates a transmission symbol provided from the first CSM MS and a transmission symbol provided from the second CSM MS. In this process, various well-known algorithms for MIMO detection may be used. Examples of such algorithms include a Maximum Likelihood (ML) method, a Successive Interference Cancellation (SIC) method, and a Modified ML (MML) method. The MIMO detector 312 may generate a soft decision value (e.g., Log Likelihood Ratio (LLR)) for the estimated transmission symbol.

The channel decoder 314-1 performs a soft decision decoding process on LLRs, received from the MIMO detector 312, of the first CMS MS. As a result, a data bit-stream transmitted from the first CSM MS is restored. The channel decoder 314-2 performs a soft decision decoding process on LLRs, received from the MIMO detector 312, of the second CMS MS. As a result, a data bit-stream transmitted from the second CSM MS is restored.

Figure 4:
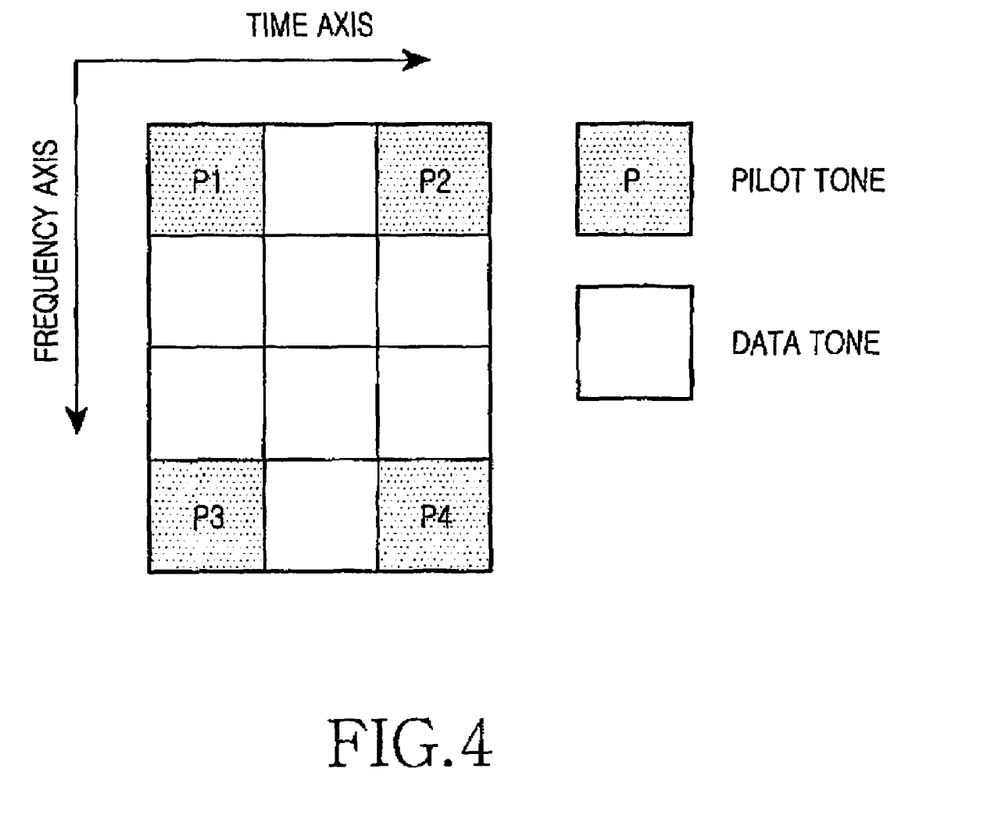
FIG. 4 illustrates a Partial Usage of Sub-Carrier (PUSC) tile structure in a BWA system.

FIG. 4 illustrates a PUSC tile structure in a BWA system. Referring to FIG. 4, one tile is composed of four consecutive sub-carriers (tones) in the frequency axis and three OFDM symbols in the time axis. That is, one tile is composed of a total of 12 components (4 tones×3 OFDM symbols). Herein, the number of data tones is 8, and the number of pilot tones is 6. The pilot tone is defined as a tone for transmitting a pre-defined signal (pilot signal) which is known by a BS and an MS. The location of the pilot tone is predefined. For convenience of explanation, it will be assumed that the pilot signal has a value of 1, and one PUSC sub-channel is composed of 6 tiles.

Through the PUSC sub-channel, CSM is possible in which two MSs (or users) can transmit signals at the same time. In the CSM scheme, the two MSs transmit different data through the same resource, and the different data is detected using MIMO detection by the BS.

Figure 5:
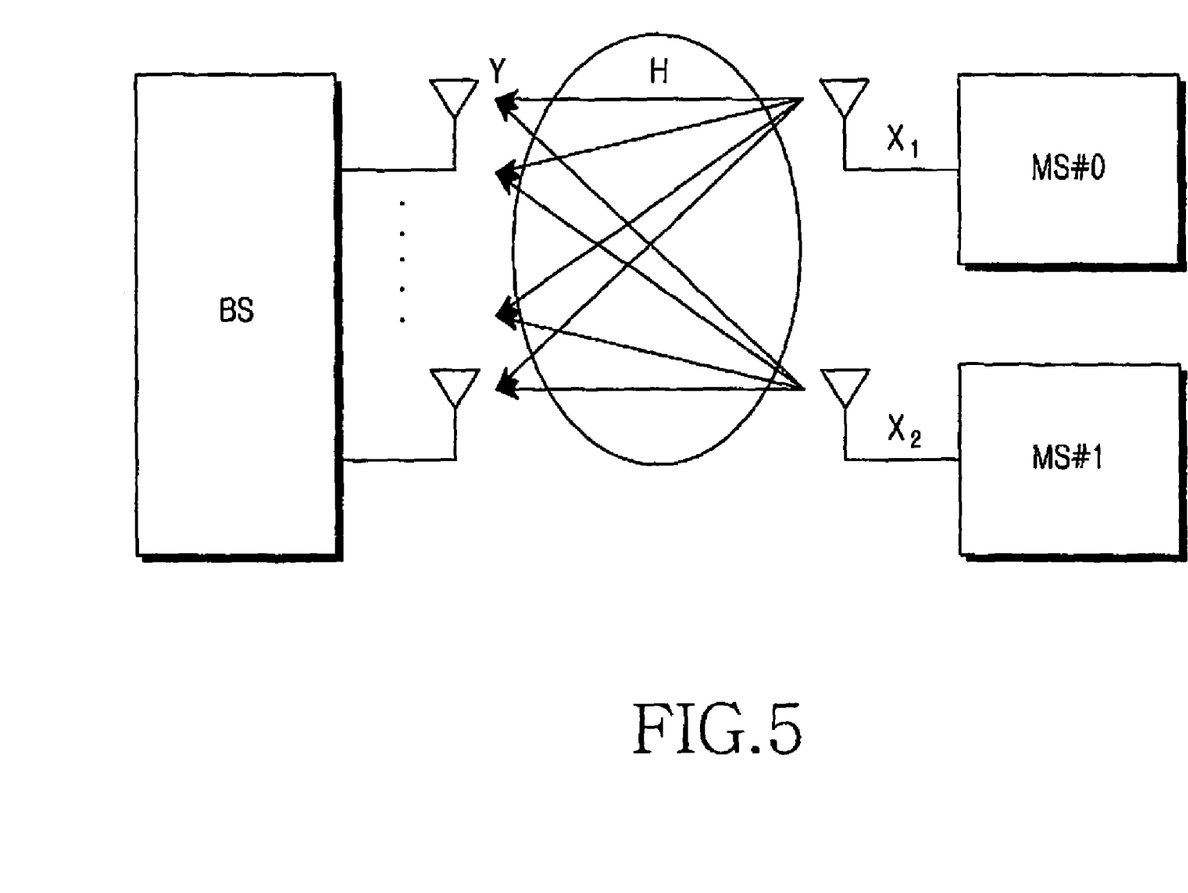
FIG. 5 explains a Collaborative Spatial Multiplexing (CSM) according to the present invention.

FIG. 5 explains a concept of CSM according to the present invention. Referring to FIG. 5, one BS and a plurality of MSs (i.e., MS#0 and MS#1) are included in a virtual MIMO environment. If each MS is considered as a virtual transmitting antenna, a MIMO environment is formed with two transmitting antennas and $N_R$ receiving antennas. In this case, since each MS transmits different data, a transmitting end operates in a Spatial Multiplexing (SM) manner and a receiving end (or BS) detects the different data through MIMO detection.

As such, when the PUSC sub-channel operates in the CSM mode, two pilot tones out of the four pilot tones exiting in one tile are assigned to each MS, and all data tones are assigned to the two MSs.

FIG. 6 illustrates a tile structure according to a CSM mode. Referring to FIG. 6, second and third pilot tones P2 and P3 among a total of four pilot tones are assigned to an MS#0, and first and fourth pilot tones P1 and P4 are assigned to an MS#1. An interference canceller is now described which cancels 10 interference of different signals in a system having a sub-channel of FIG. 6.

Figure 7:
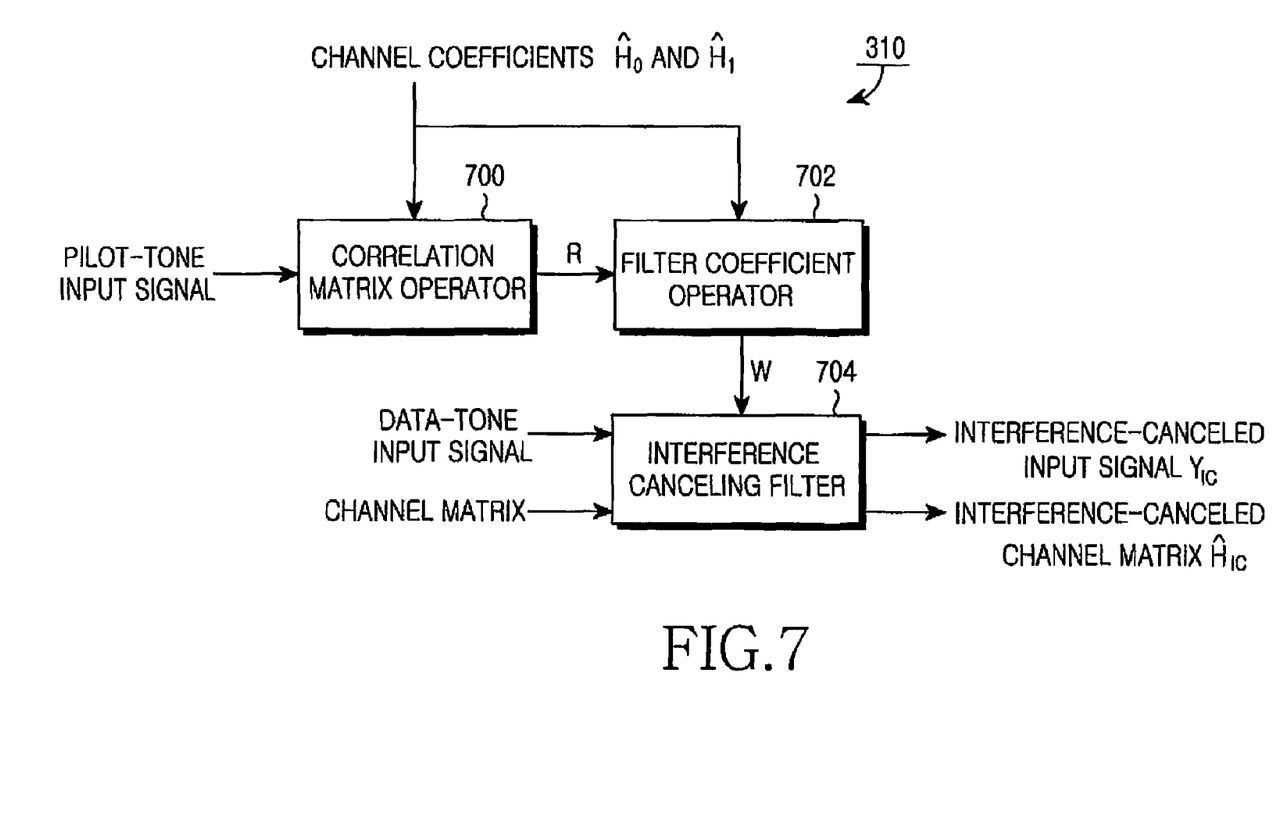
FIG. 7 is a block diagram of a Minimum Mean Square Error (MMSE) interference canceller according to the present invention.

FIG. 7 is a block diagram of the MMSE interference canceller 310 according to the present invention. Referring to FIG. 7, the MMSE interference canceller 310 includes a correlation matrix operator 700, a filter coefficient operator 702, and an interference canceling filter 704.

The correlation matrix operator 700 computes a correlation matrix R of Equation (4) below using two channel coefficient vectors $\hat{H}_0$ and $\hat{H}_1$ received from the channel estimators 308-1 to 308-$N_R$ (see FIG. 3) and pilot-tone input vectors $Y_1, Y_2, Y_3$, and $Y_4$ received from the sub-channel extractors 306-1 to 306-$N_R$ (see FIG. 3).

$$R = \frac{1}{4}\{(Y_1 - \hat{H}_1)(Y_1 - \hat{H}_1)^H + (Y_4 - \hat{H}_1)(Y_4 - \hat{H}_1)^H + \qquad (4)$$
$$(Y_2 - \hat{H}_0)(Y_2 - \hat{H}_0)^H + (Y_3 - \hat{H}_0)(Y_3 - \hat{H}_0)^H\}$$

Herein, $Y_i$ (i=1, 2, 3, 4) is the same as $P_i$ (i=1, 2, 3, 4) of FIG. 6.

In Equation (4), a desired signal value is subtracted from an input signal, which is different from a general MMSE scheme. By doing so, only noise and interference components remain. That is, a filter convergence speed can be prompted by obtaining an average value of a correlation between the noise and interference components.

The filter coefficient operator 702 computes a filter coefficient using the correlation matrix R provided from the correlation matrix operator 700 and the channel coefficient vectors $\hat{H}_0$ and $\hat{H}_1$ provided from the channel estimators 308-1 to 308-$N_R$ (see FIG. 3). Herein, a filter coefficient W may be computed as expressed by Equation (5) below.

$$W = \hat{H}^H \cdot R^{-1}, (\hat{H} = [\hat{H}_0 \hat{H}_1]) \qquad (5)$$

Equation (5) is used to obtain a filter coefficient whereby an estimated channel is orthogonalized with respect to the correlation matrix of interference and noise. Herein, W is a $2 \times N_R$ matrix.

The interference canceling filter 704 cancels interference from an input signal of a corresponding tile using the filter coefficient W provided from the filter coefficient operator 702. Furthermore, the interference canceling filter 704 cancels interference from the channel matrix $\hat{H}$ of a corresponding tile by using the filter coefficient W. This can be expressed as Equation (6) below.

$$Y_{IC} = WY$$
$$\hat{H}_{IC} = W\hat{H} \qquad (6)$$

Herein, an input signal Y is an $N_R \times 1$ column vector, and is transformed to a $2 \times 1$ column vector according to Equation (6) above. In addition, the channel coefficient matrix $\hat{H}$ is an $N_R \times 2$ matrix, and is transformed to a $2 \times 2$ matrix according to Equation (6) above.

As a result, the interference-cancelled input signal $Y_{IC}$ output from the interference canceller 310 (see FIG. 3) is a $2 \times 1$ column vector, and the interference cancelled channel matrix $\hat{H}_{IC}$ is a $2 \times 2$ matrix. Accordingly, it can be regarded as a virtual $2 \times 2$ MIMO system.

Figure 8:
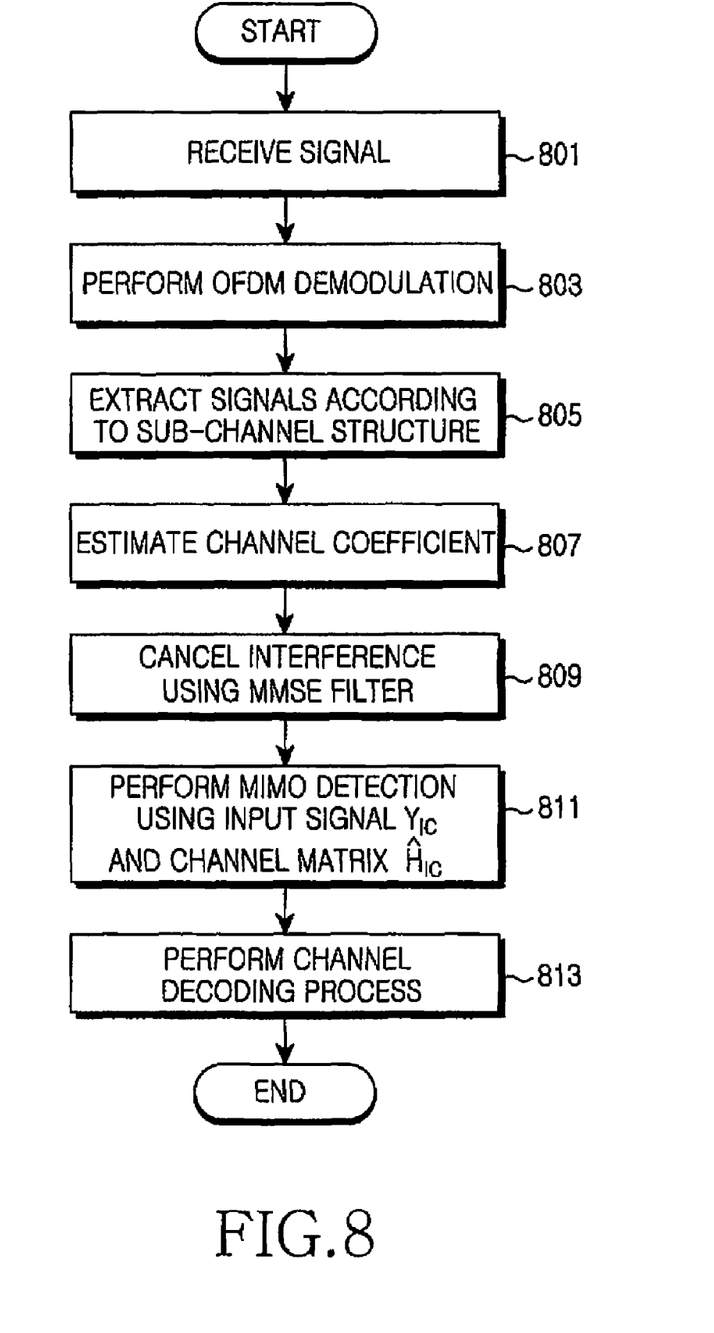
FIG. 8 is a flowchart illustrating a general operation of a receiver in a BWA system according to the present invention.

FIG. 8 is a flowchart illustrating a general operation of a receiver in a BWA system according to the present invention. It is assumed hereinafter that a PUSC sub-channel structure is used and the PUSC sub-channel operates in a CSM mode.

Referring to FIG. 8, in step 801, a signal is received using $N_R$ receiving antennas. The received signal is composed of a desired signal component as well as interference and noise components.

Upon receiving the signal through the receiving antennas, in step 803, the received RF signal is converted into a baseband signal, and then the baseband signal is subject to an OFDM demodulation process, thereby generating frequency-domain data. In step 805, according to a sub-channel structure, a data signal and a pilot signal are separately extracted from the frequency-domain data.

In this case, four pilot signals are extracted for each tile, wherein two signals are signals of a first CSM MS and the other two signals are signals of a second CSM MS. Input signals for each tone can be represented by an $N_R \times 1$ column vector.

In step 807, using the extracted pilot signals, a channel coefficient vector $\hat{H}_0$ of the first CSM MS and a channel coefficient vector $\hat{H}_1$ of the second CSM MS are estimated.

After obtaining the channel coefficient vectors, in step 809, an interference component is cancelled from each data-tone input signal using an MMSE based interference canceling filter, and then interference is cancelled from a channel matrix composed of the two channel coefficient vectors. In this case, a correlation matrix required for the MMSE based interference canceling filter can be computed as expressed by Equation (4) above. Although each data-tone input signal is represented by an $N_R \times 1$ column vector, it can be converted into a $2 \times 1$ column vector $Y_{IC}$ after canceling interference. In addition, although the channel matrix is an $N_R \times 2$ matrix, it can be converted into a $2 \times 2$ matrix $\hat{H}_{IC}$ after canceling interference.

In step 811, by using the interference-cancelled input vector $Y_{IC}$ and the interference-cancelled channel matrix $\hat{H}_{IC}$, a $2 \times 2$ MIMO detection process is carried out, and thus a transmission symbol of the first CSM MS and a transmission symbol of the second CSM MS are estimated. The estimation value may be an LLR.

In step 813, LLRs of the first CSM MS are subject to a soft decision decoding process, and thus a data bit-stream of the first CSM MS is restored. In addition, LLRs of the second CSM MS are subject to a soft decision decoding process, and thus a data bit-stream of the second CSM MS is restored.

According to an interference canceling method of the present invention, computational complexity is significantly reduced since by eliminating estimation of a channel of interference signals. Thus, a Mobile Station (MS) does not have to know information on a preamble or pilot signal of a Base Station (BS) because estimation of the interference signal channel is not required. Furthermore, an additional algorithm for determining the most serious interference or the number of interferences is not necessary. When there is no interference, the same method as the known Maximum Ratio Combing (MRC) method is used, and thus there is no need to switch demodulation algorithms according to the presence of interference.

In addition, according to the present invention, MIMO detection can be achieved in a reliable manner since the MIMO detection is carried out in a Collaborative Spatial Multiplexing (CSM) mode by using an interference-cancelled input vector and an interference-cancelled channel matrix. As such, by enhancing system reliability, there is an advantage in that a better quality service can be provided, and eventually system capacity increases.

While the invention has been shown and described with reference to certain preferred embodiments thereof, it will be understood by those skilled in the art that various changes in form and details may be made therein without departing from the spirit and scope of the invention as defined by the appended claims. For example, although it has been described above that a specific sub-channel structure is used, this is an explanation purpose only. Thus, the present invention may also be applied to other systems having a different sub-channel structure supporting a CSM mode. In addition, although the number of CSM MSs using the same resource is assumed to be 2 in the description above, in practice, more CSM MSs may use the same resource according to the number of receiving antennas of a Base Station (BS). The present invention may also be applied to a general MIMO system including an MS having a plurality of transmitting antennas and a BS having a plurality of receiving antennas.

Therefore, the scope of the invention is defined not by the detailed description of the invention but by the appended claims, and all differences within the scope will be construed as being included in the present invention.

What is claimed is:

1. A receiving apparatus in a wireless access system, the apparatus comprising:

a channel estimator for estimating channel coefficients, based on vectors corresponding to a specific input signal, of a plurality of Mobile Stations (MSs) using a same resource;

an interference canceller for canceling interference from an input vector based on a channel matrix and a correlation matrix, wherein the correlation matrix is computed by subtracting estimated channel coefficients of a desired MS from the vectors corresponding to the specific input signal to generate a subtraction signal and further correlating the subtraction signal to generate the correlation matrix; and a detector for performing Multiple Input Multiple Output (MIMO) detection using the interference-cancelled input vector and the interference-cancelled channel matrix.

2. The apparatus of claim 1, wherein the same resource is a tile of a Partial Usage of Sub-Carrier (PUSC) sub-channel operating in a Collaborative Spatial Multiplexing (CSM) mode.

3. The apparatus of claim 1, wherein the specific input signal is a pilot-tone input signal.

4. The apparatus of claim 1, wherein the interference canceller cancels interference based on a Minimum Mean Square Error (MMSE) scheme.

5. The apparatus of claim 1, wherein the channel estimator computes a channel coefficient for each MS by averaging pilot signals transmitted by the MSs.

6. The apparatus of claim 1, wherein the correlation matrix, R, is expressed as:

$$R = \frac{1}{N}\sum_{n=1}^{N}\{(Y_n - \hat{H})(Y_n - \hat{H})^H\},$$

where N denotes a number of pilot tones existing within the same resource, $Y_n$ denotes an input signal of an n-th pilot tone, and $\hat{H}$ denotes an average channel coefficient for the same resource of an MS using the n-th pilot tone.

7. The apparatus of claim 1, wherein the interference canceller comprises:
a correlation matrix operator for computing the coefficient matrix by subtracting a channel coefficient of a corresponding MS from the specific input signal within the same resource and by auto-correlating the subtracted signal; and
a filter coefficient operator for computing a coefficient of an interference canceling filter using the correlation matrix and the channel coefficients of the MSs;
wherein the interference canceling filter uses the coefficient of the interference canceling filter for computing the interference-cancelled input vector by canceling interference from a data-tone input vector and for computing the interference-cancelled channel matrix by canceling interference from the channel matrix composed of channel coefficient vectors of the MSs.

8. The apparatus of claim 7, wherein the coefficient, W, of the interference canceling filter is expressed as:

$$W = \hat{H}^H \cdot R^{-1},$$

where $\hat{H}$ denotes a channel matrix composed of channel coefficient vectors of the MSs, and R denotes a correlation matrix.

9. The apparatus of claim 1, wherein a transmission symbol estimation value output from the MIMO detector is a Log Likelihood Ratio (LLR).

10. The apparatus of claim 1, further comprising a channel decoder which decodes a transmission symbol estimation value for each MS and restores a data bit-stream of each MS.

11. A receiving method in a wireless access system, the method comprising the steps of:
estimating channel coefficient vectors, based on vectors corresponding to a specific input signal, of a plurality of Mobile Stations (MSs) using a same resource;
computing a correlation matrix by subtracting an estimated channel coefficient vector of a desired MS from the vectors corresponding to the specific input signal to generate a subtraction signal and further correlating the subtraction signal to generate the correlation matrix;
canceling interference from a data-tone input vector based on a channel matrix and the correlation matrix; and
estimating a transmission symbol for each MS by performing Multiple Input Multiple Output (MIMO) detection using the interference-cancelled input vector and the interference-cancelled channel matrix.

12. The method of claim 11, wherein the same resource is a tile of a Partial Usage of Sub-Carrier (PUSC) sub-channel operating in a Collaborative Spatial Multiplexing (CSM) mode.

13. The method of claim 11, wherein the specific tone is a pilot tone.

14. The method of claim 11, wherein, in the step of canceling interference, interference is cancelled based on a Minimum Mean Square Error (MMSE) scheme.

15. The method of claim 11, wherein, in the step of estimating channel coefficient vectors, a channel coefficient for each MS is computed by averaging pilot signals transmitted by the MSs.

16. The method of claim 11, wherein the correlation matrix R is expressed as:

$$R = \frac{1}{N}\sum_{n=1}^{N}\{(Y_n - \hat{H})(Y_n - \hat{H})^H\},$$

where N denotes a number of pilot tones existing within the same resource, $Y_n$ denotes an input vector of an n-th pilot tone, and $\hat{H}$ denotes an average channel coefficient vector for the same resource of an MS using the n-th pilot tone.

17. The method of claim 11, wherein the step of canceling interference comprises:
computing a coefficient of an interference canceling filter using the correlation matrix and the channel coefficient vectors of the MSs;
computing the interference-cancelled input vector by canceling interference from the data-tone input vector according to the coefficient of the interference canceling filter; and
computing the interference-cancelled channel matrix by canceling interference from the channel matrix composed of the channel coefficient vectors of the MSs according to the coefficient of the interference canceling filter.

18. The method of claim 17, wherein the coefficient W of the interference canceling filter is expressed as:

$$W = \hat{H}^H \cdot R^{-1},$$

where $\hat{H}$ denotes a channel matrix composed of channel coefficient vectors of the MSs, and R denotes a correlation matrix.

19. The method of claim 11, wherein a transmission symbol estimation value is a Log Likelihood Ratio (LLR).

20. The method of claim 11, further comprising decoding the transmission symbol estimation value for each MS and restoring a data bit-stream of each MS.

* * * * *